(12) United States Patent
Garneau et al.

(10) Patent No.: US 12,168,406 B2
(45) Date of Patent: Dec. 17, 2024

(54) GROUND-LOADING VEHICLE PLATFORM FOR PICKUP TRUCK

(71) Applicant: 3DESCO DESIGN INC., Saint-Mathieu-de-Beloeil (CA)

(72) Inventors: François Garneau, Beloeil (CA); Pascal Laurendeau, Verdun (CA)

(*) Notice: Subject to any disclaimer, the term of this patent is extended or adjusted under 35 U.S.C. 154(b) by 0 days.

(21) Appl. No.: 17/348,201

(22) Filed: Jun. 15, 2021

(65) Prior Publication Data

US 2021/0380030 A1 Dec. 9, 2021

Related U.S. Application Data

(63) Continuation of application No. 15/644,746, filed on Jul. 8, 2017, now Pat. No. 11,059,410.

(30) Foreign Application Priority Data

Jul. 9, 2016 (GB) ...................................... 1611973

(51) Int. Cl.
*B60P 1/44* (2006.01)
*B60P 1/48* (2006.01)
*B60P 3/06* (2006.01)

(52) U.S. Cl.
CPC ............ *B60P 1/4407* (2013.01); *B60P 1/4471* (2013.01); *B60P 1/48* (2013.01); *B60P 3/06* (2013.01)

(58) Field of Classification Search
CPC ......... B60P 1/4407; B60P 1/4471; B60P 1/48; B60P 1/44; B60P 1/43; B60P 1/431; B60P 1/30; B60P 1/34; B60P 1/6427; B60P 1/64; B60P 1/6463; B60P 1/6454; B60P 1/433; B60P 1/14; B60P 1/649; B60P 1/6418; B60P 3/06; B60P 3/07; B60P 3/122; B60P 3/125; B60P 3/062; B60P 3/064; B65D 88/005; B65D 88/12
See application file for complete search history.

(56) References Cited

U.S. PATENT DOCUMENTS

| | | | |
|---|---|---|---|
| 2,497,472 A | 2/1950 | Sims | |
| 2,763,384 A | 9/1956 | Foster | |
| 3,819,075 A | 6/1974 | Derain | |
| 3,872,989 A | 3/1975 | Smithson et al. | |
| 4,274,788 A | 6/1981 | Sutton | |
| 4,372,727 A * | 2/1983 | Fredrickson | B60P 1/433 296/61 |
| 4,548,541 A | 10/1985 | Corompt | |
| 4,761,015 A | 8/1988 | Carr | |

(Continued)

*Primary Examiner* — Glenn F Myers
(74) *Attorney, Agent, or Firm* — Anglehart et al.

(57) ABSTRACT

A hydraulic deck comprising a frame consisting of a pair of horizontal members and a pair of vertical members, wherein the frame is configured to be mounted in a bed of a pickup truck; a pair of pivot arm members in telescoping engagement with the pair of horizontal members and a pair of extension members in telescoping engagement with the pair of vertical members; a platform member configured to support at least one vehicle; a pair of pillars rotationally connected to pin members positioned on the pair of extension members, wherein the pair of pillar extend perpendicularly from the platform member; and a mechanically operating lifting system configured to slide and lower the platform from the bed in a stored position to a ground surface in a loading position.

20 Claims, 12 Drawing Sheets

(56) References Cited

U.S. PATENT DOCUMENTS

| | | | |
|---|---|---|---|
| 4,921,389 A | 5/1990 | O'Daniel | |
| 5,232,329 A | 8/1993 | Livingston | |
| 5,431,525 A * | 7/1995 | Scott | B60R 9/0426 296/61 |
| 5,511,928 A | 4/1996 | Ellis | |
| 5,620,296 A | 4/1997 | McMahon et al. | |
| 5,967,735 A | 10/1999 | Smart et al. | |
| 6,152,674 A | 11/2000 | Ogrodnick | |
| 6,457,931 B1 * | 10/2002 | Chapman | B60P 1/6463 414/491 |
| 6,705,820 B2 | 3/2004 | Schilling | |
| 7,300,239 B2 | 11/2007 | Benedikt | |
| 7,302,725 B2 | 12/2007 | Thygesen | |
| 7,341,419 B1 | 3/2008 | Fink et al. | |
| 7,455,489 B1 * | 11/2008 | Klev | B60P 3/42 410/3 |
| 7,901,174 B2 | 3/2011 | Cullum et al. | |
| 8,021,096 B2 | 9/2011 | Railsback | |
| 8,215,893 B2 | 7/2012 | Simpson | |
| 9,545,868 B1 * | 1/2017 | Downing | B66F 9/10 |
| 9,789,802 B2 * | 10/2017 | Bartelt | B60P 1/6463 |
| 9,821,699 B2 | 11/2017 | Clark | |
| 2002/0136621 A1 | 9/2002 | Scherle | |
| 2003/0072641 A1 | 4/2003 | Reed et al. | |
| 2004/0028511 A1 | 2/2004 | Eaton | |
| 2004/0156703 A1 * | 8/2004 | Benedikt | B60P 1/6463 414/498 |
| 2006/0045692 A1 * | 3/2006 | Mills | B60P 1/6463 414/477 |
| 2006/0182573 A1 | 8/2006 | Taylor | |
| 2009/0025154 A1 * | 1/2009 | Smith | B60P 3/122 14/71.7 |
| 2010/0196131 A1 * | 8/2010 | Blom | B60P 3/07 414/471 |
| 2013/0149086 A1 * | 6/2013 | Railsback | B60P 1/6463 414/478 |
| 2013/0230374 A1 * | 9/2013 | Kerkvliet | B60P 1/6463 414/477 |
| 2016/0137118 A1 * | 5/2016 | Piacentino | B60P 1/52 414/538 |
| 2016/0185272 A1 * | 6/2016 | Clark | B60P 1/4492 414/477 |

* cited by examiner

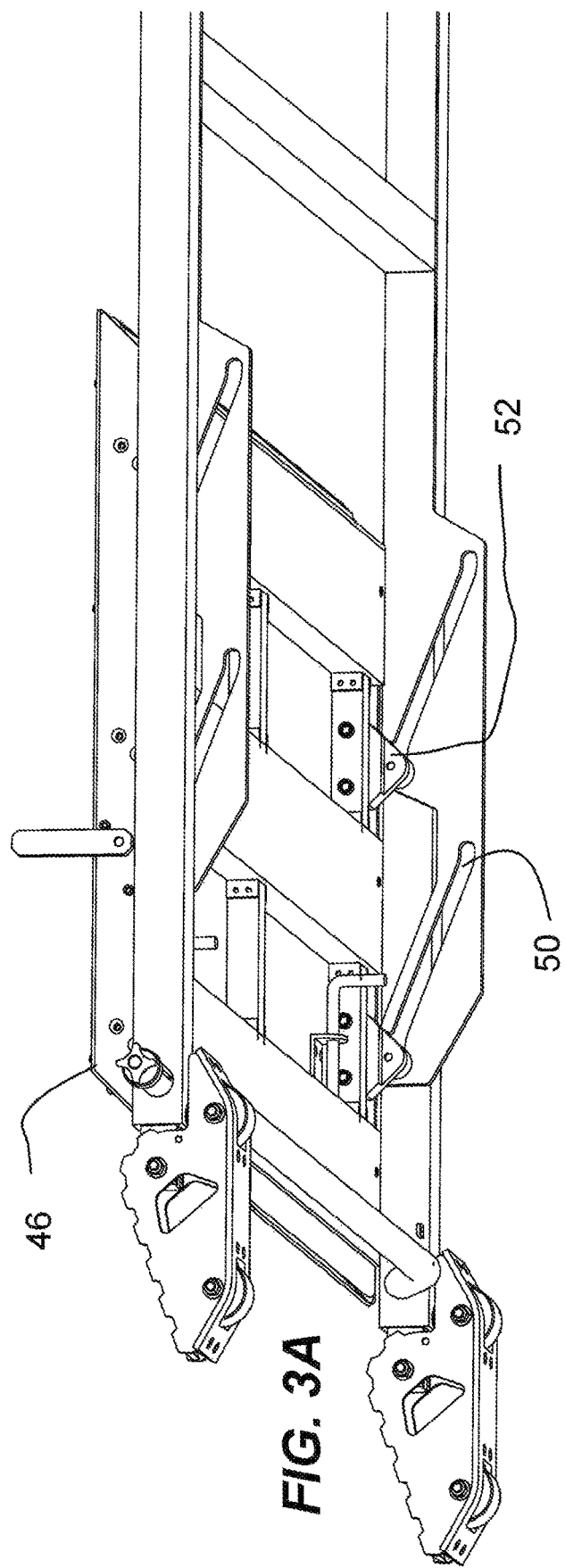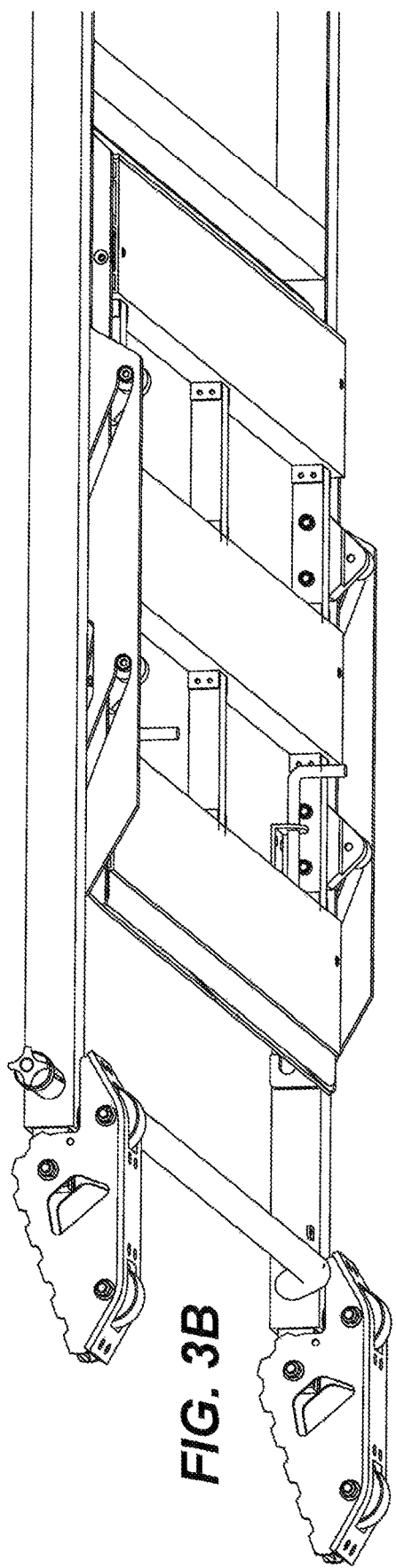
FIG. 3A
FIG. 3B

GROUND-LOADING VEHICLE PLATFORM FOR PICKUP TRUCK

CROSS-REFERENCE TO RELATED APPLICATIONS

The present application is a continuation application of U.S. patent application Ser. No. 15/644,746 filed on Jul. 8, 2017, now allowed, which, in turn, claims priority to United Kingdom Patent Application serial number 1611973.7, filed on Jul. 9, 2016 entitled "Hydraulic Deck for Sled and All Terrain Vehicle (ATV)", the contents of which are hereby incorporated by reference in their entirely.

BACKGROUND OF THE INVENTION

1. Field of the Invention

The present invention generally relates to racks, attachment structures and platforms but more particularly to a hydraulic deck for mounting vehicles on a pickup truck.

2. Description of Related Art

There are limited options when transported recreational vehicles, such as snowmobiles, ATV, and motorcycles. One option is by way of a hitched trailer. Another option is by mounting and securing them inside a bed of a pickup truck. In both cases, a ramp is required for loading and unloading the recreational vehicle. In the art, there are tiltable trailers that exist, which do not require a ramp, as the tilting of the trailer brings its tail down to the ground. In all cases, however, there is an incline that has to be negotiated and it can be challenging if the recreational vehicle is heavy. Consequently, there needs to be an improved for mounting recreational vehicles on a pickup truck.

BRIEF SUMMARY OF THE INVENTION

In one embodiment of the present invention, hydraulic deck is provided, comprising a frame consisting of a pair of horizontal members and a pair of vertical members, wherein the frame is configured to be mounted in a bed of a pickup truck; a pair of pivot arm members in telescoping engagement with the pair of horizontal members and a pair of extension members in telescoping engagement with the pair of vertical members; a platform member configured to support at least one vehicle; a pair of pillars rotationally connected to pin members positioned on the pair of extension members, wherein the pair of pillar extend perpendicularly from the platform member; and a mechanically operating lifting system configured to slide and lower the platform from the bed in a stored position to a ground surface in a loading position.

In one embodiment, the mechanically operating lifting system includes a pair of weldments forming a structural body configured and sized to fit inside the bed of the pickup truck. In one embodiment, the mechanically operating lifting system comprises a pair of chain loops and a pair of piston members, wherein each of the pair of chain loops are configured to engage a first and second pair of sprockets respectively, and the pair of piston members each having a piston rod connected to each of the pair of chain loops via connection brackets. In one embodiment, the pair of chain loops, the pair of piston members, the first and second pair of sprockets, and connection brackets are designed to fit inside the pair of weldments. In one embodiment, each of the first and second pair of sprockets of are located at opposite ends of each of the pair of chain loops respectively.

In one embodiment, a pair of sprocket adjustment members configured to adjust the distance between the each of the first and second pairs of sprockets to regulate the tension of each of the pair of chain loops are provided. In another embodiment, a plurality of turnbuckles configured to attach the structural body to the bed of the pickup truck are provided. In one embodiment, the structural body includes a pair of extension elements configured to support and guide the platform member during operation, wherein each of the pair of extension elements include a caster wheel at each respective distal end of the pair of extension elements. In another embodiment, each of the pair of extension elements are constructed with a hockey stick shape. In yet another embodiment, a sub platform underneath the platform member is provided. In one embodiment, the sub platform includes a pair of support ledges configured to provide support to the at least one vehicle.

In one embodiment, the at least one vehicle is a vehicle having a sled. In another embodiment, the at least one vehicle is selected from the list of an all-terrain vehicle, an off-highway vehicle, a utility vehicle, a motorcycle, or a sled vehicle. In one embodiment, extension support members configured to accept two vehicles side by side are provided. In yet another embodiment, a pair of skates extending from a pair of protracting members are provided, wherein the pair of skates is configured to make first contact with the ground surface when the platform is lowered. In one embodiment, each of the pair of skates includes a wheel facilitating the operation of the platform member after first contact with the ground surface.

BRIEF DESCRIPTION OF THE SEVERAL VIEWS OF THE DRAWINGS

Other features and advantages of the present invention will become apparent when the following detailed description is read in conjunction with the accompanying drawings, in which:

FIGS. 3A-B are isometric views of the sub platform of the hydraulic deck according to an embodiment of the present invention.

DETAILED DESCRIPTION OF THE PREFERRED EMBODIMENT

Figure 1:
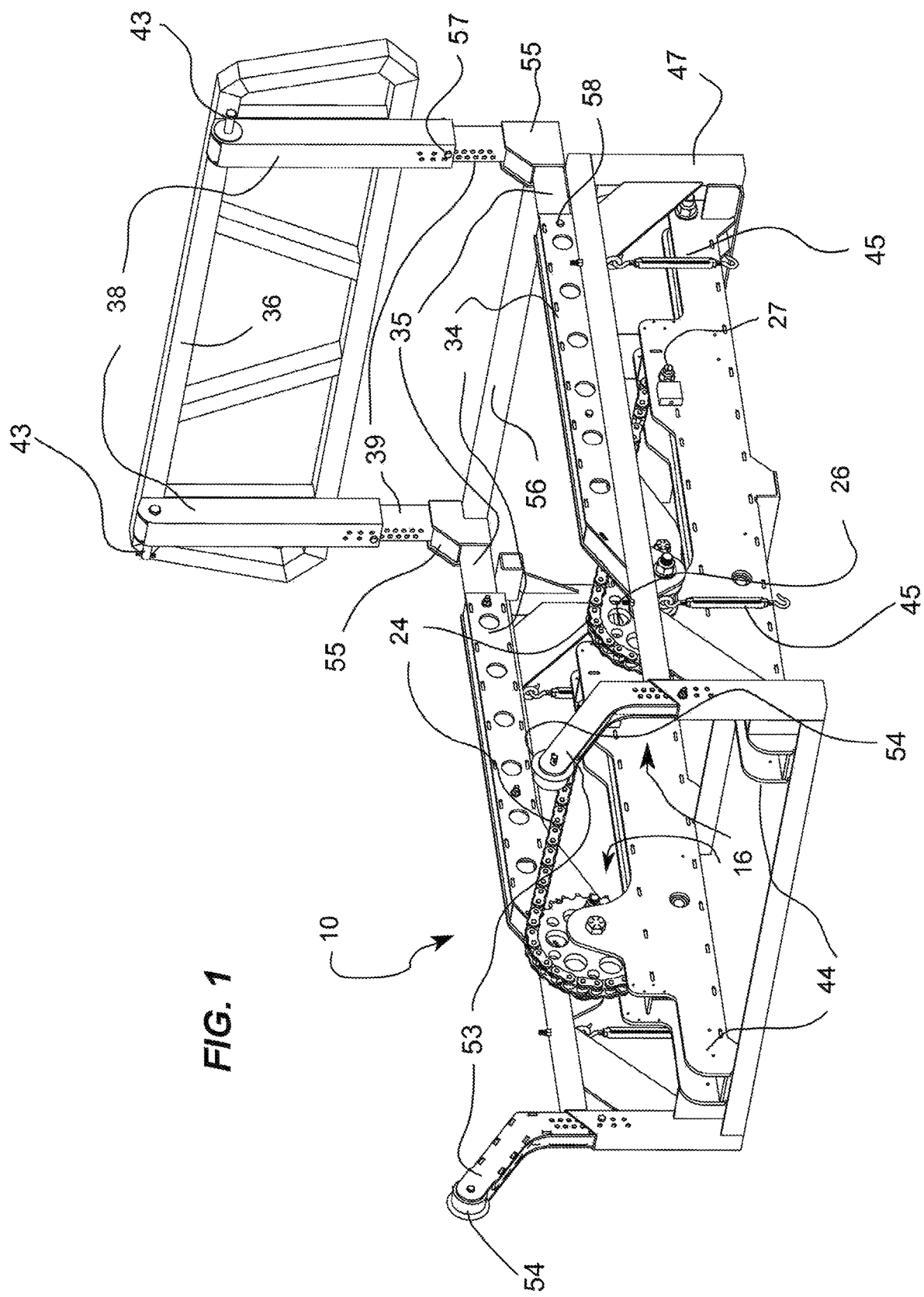
FIG. 1 is a perspective view of a hydraulic deck according to an embodiment of the present invention.
Figure 2:
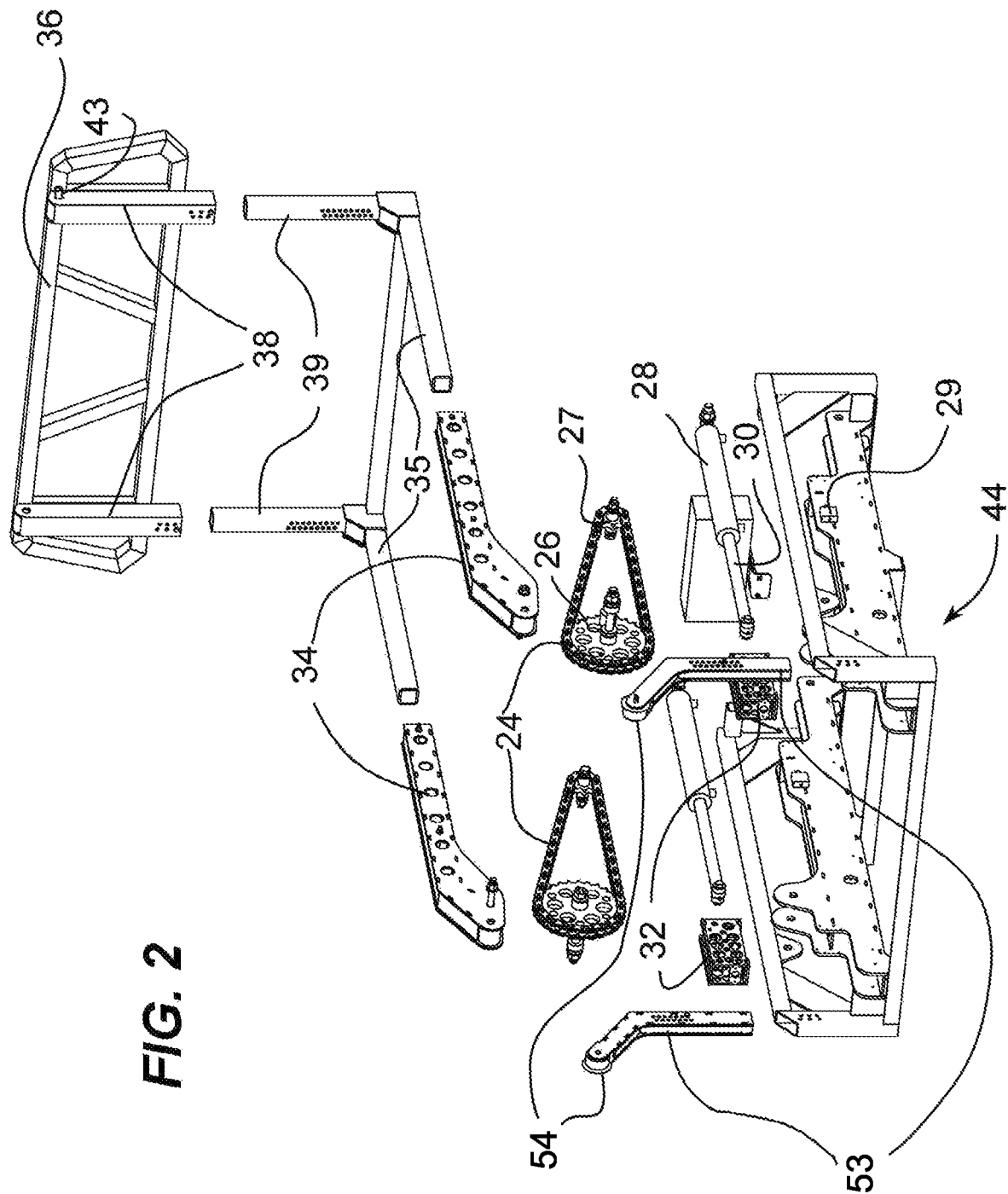
FIG. 2 is an exploded view of the hydraulic deck according to an embodiment of the present invention.
Figure 4A:
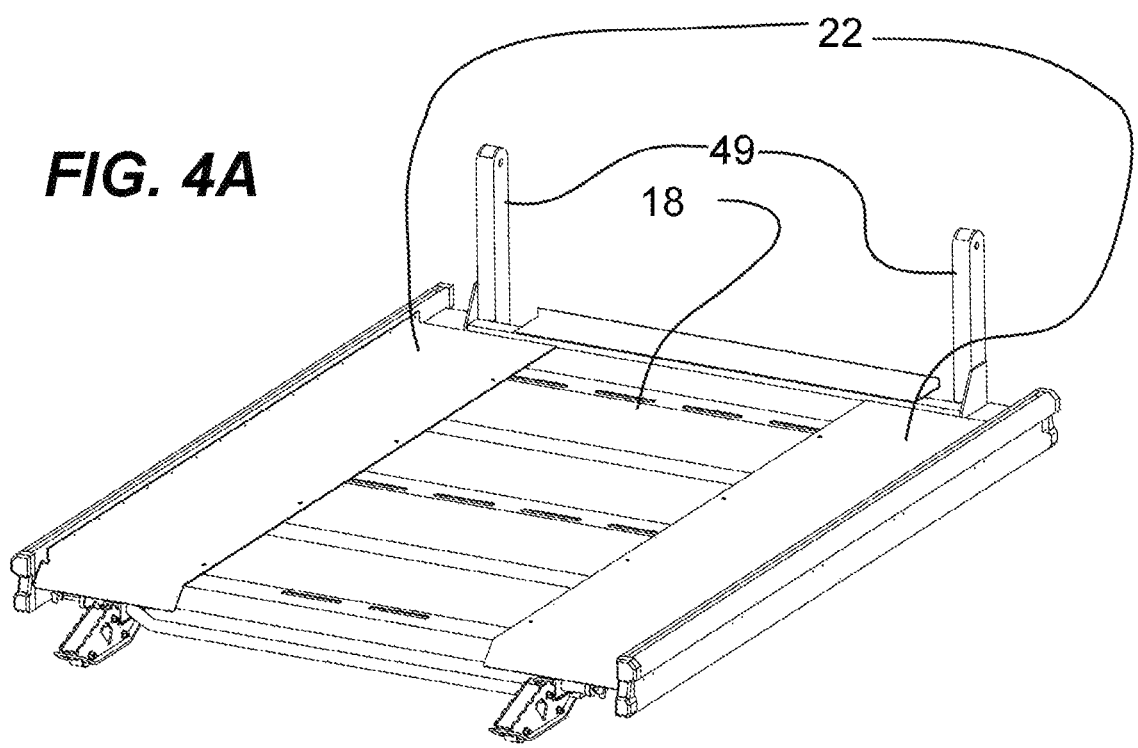
FIGS. 4A-B are isometric views of the platform with the sub platform of the hydraulic deck retracted and protracted respectfully according to an embodiment of the present invention.
Figure 4B:
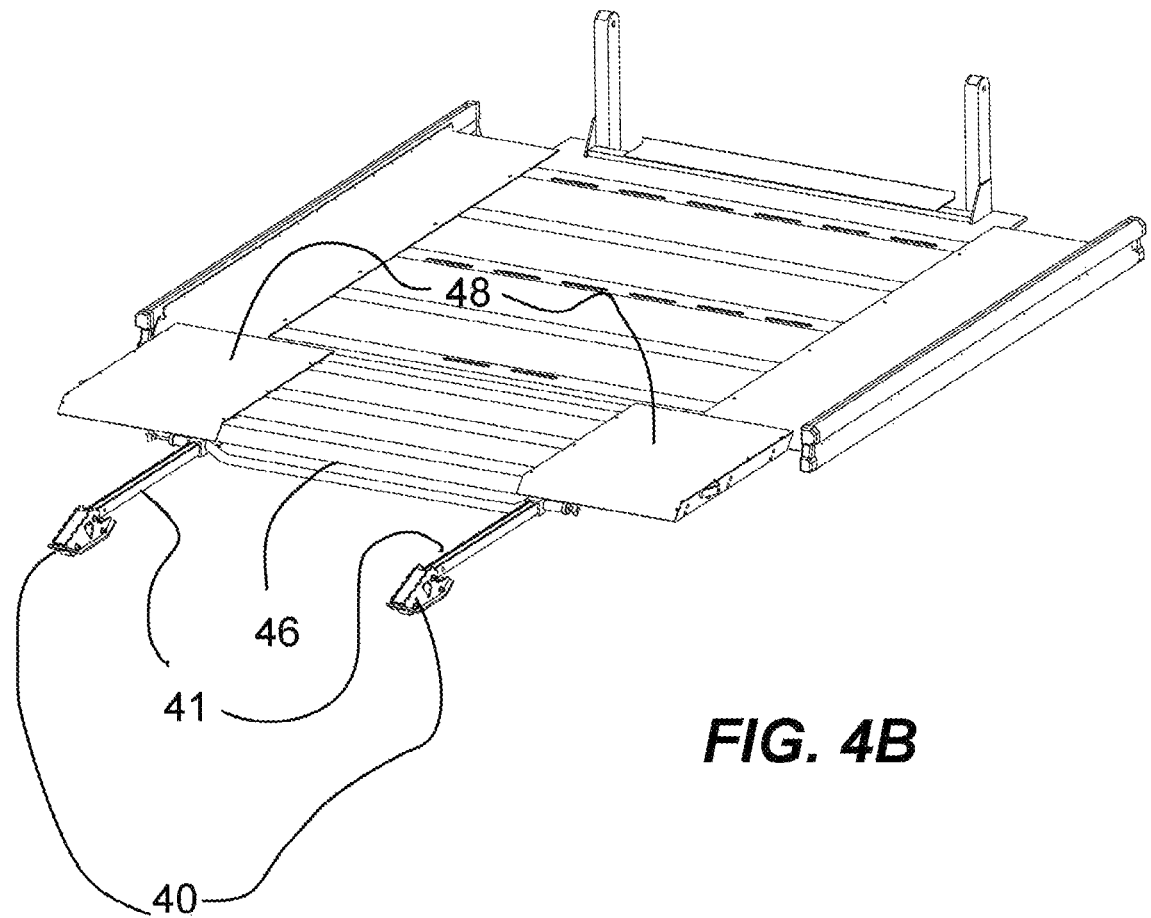
Figure 5:
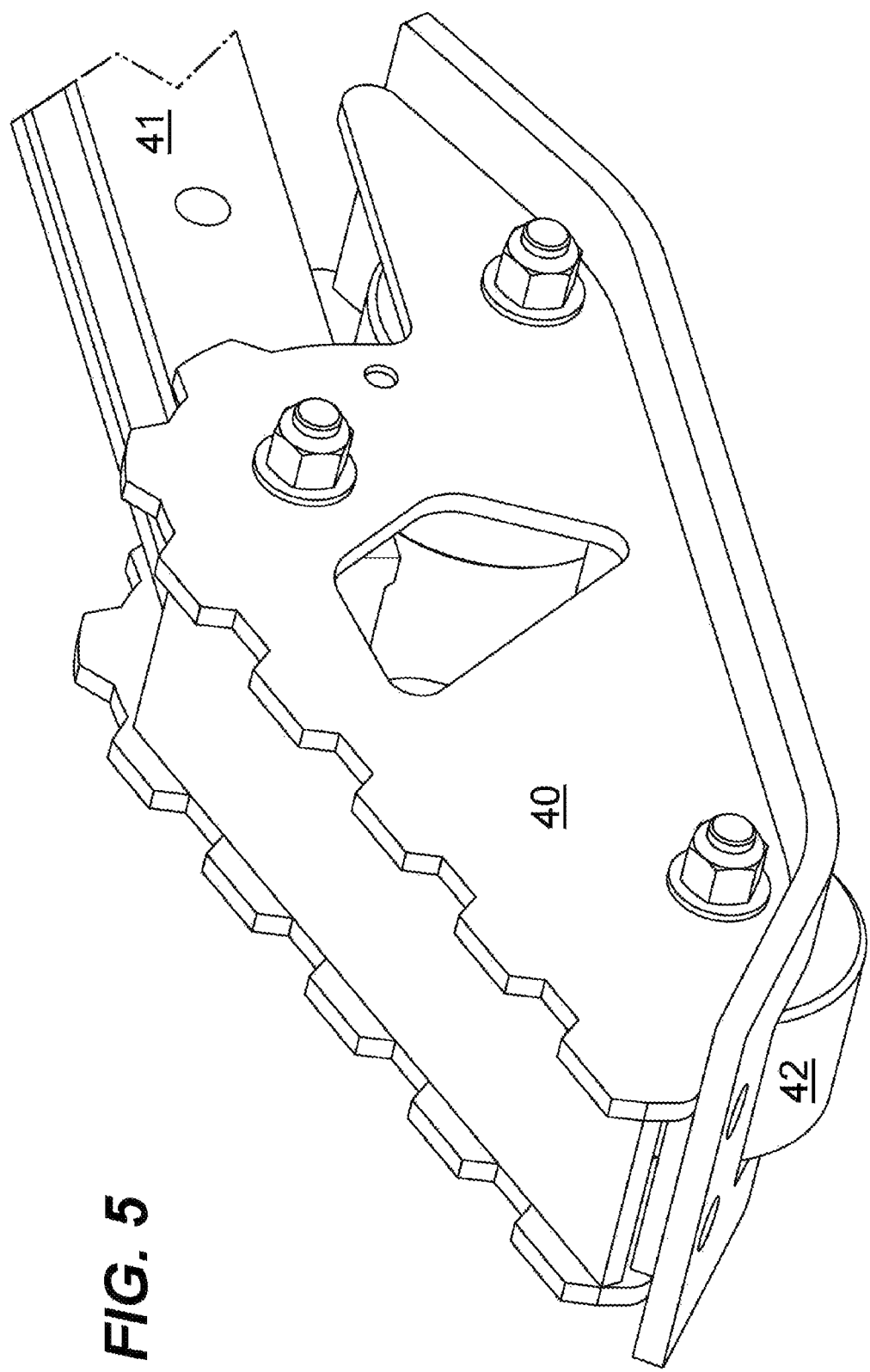
FIG. 5 is a detailed view of a skate of the hydraulic deck according to an embodiment of the present invention.
Figure 6:
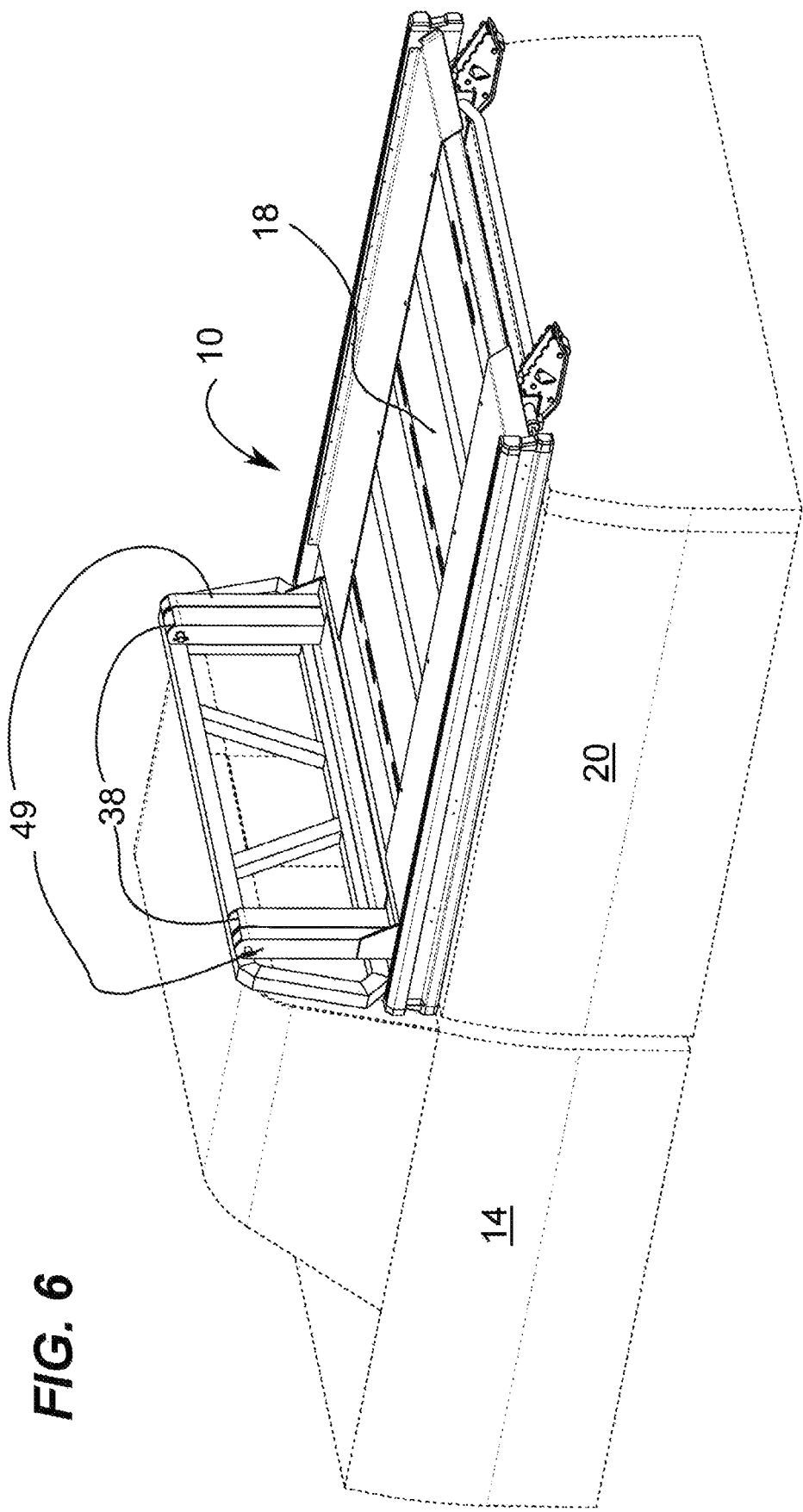
FIG. 6 is a perspective view of the hydraulic deck mounted on a pickup truck according to an embodiment of the present invention.

The following description is provided to enable any person skilled in the art to make and use the invention and sets forth the best modes contemplated by the inventor of carrying out their invention. Various modifications, however, will remain readily apparent to those skilled in the art, since the general principles of the present invention have been defined herein to specifically provide hydraulic deck for mounting vehicles on a pickup truck.

Referring now to FIGS. 1-10, a hydraulic deck 10 and various components of the hydraulic deck are illustrated. The hydraulic deck is configured to be positioned in a bed 20 of a pickup truck 14. The hydraulic lift comprises a mechanically operated lifting system 16 having a pair of chain loops 24 engaging a first and second pair of sprockets 26 and 27 respectively, wherein each of the first and second sprockets of the pair of sprockets are located at opposite ends of the pair of chain loops. The lifting system further comprises a pair of piston members 28 each having a piston rod 30 connected to the pair of chain loops via a pair of connection brackets 32. The operation and further components of the lifting system will be described in detail below.

The hydraulic deck further comprises a pair of horizontal frame members 35 and a pair of vertical frame members 39 joined via connection brackets 55 at respective proximal ends. In one embodiment, a perpendicular support frame member 56 is attached to the connection brackets, the length of the perpendicular support frame determining the width between the horizontal frame members. A pair of pivot arm members 34 is connected to the pair of horizontal frame members and a pair of extension members 38 is connected to the pair of vertical frame members. In one embodiment, the pivot arm members and extension members telescope on the horizontal and vertical frame members respectively, wherein the length of each combination is adjustable via bolts 57/58 or any other mechanical fastener as well known in the art. The adjustable combination is a particular advantage of the present invention, as the size of the frame is adjustable and is configured to allow the hydraulic deck to fit various pickup truck bed sizes. In one embodiment, a head mount 36 is fixedly attached to the pair of extension members. In one embodiment, the vertical frame members and the respective extension members are configured to fit in the front of pickup truck bed.

In one embodiment, pin members 43 are positioned at a top portion of each of the pair of extension members. In one embodiment, pillars 49 are rotationally connected to the pin members, wherein the pillars extend perpendicularly from a platform member 18. The platform member is configured to support a vehicle 12. In alternative embodiments, more than one vehicle, such as two vehicles side by side can be configured to fit when extension support members 22 are provided. The vehicle may be any sized vehicle that fits the platform member, but the hydraulic deck is specifically configured for an all-terrain vehicle (ATV), an off-highway vehicle (OHV), a utility vehicle (UTV), a motorcycle, or a sled vehicle, such as a snowmobile.

During operation, when the piston rods retract, the pair of chain loops and the first sprockets rotate. As the first sprockets rotate, the pair of pivot arm members connected the first sprockets rotate which lifts and slides the platform member out of the bed of the pickup truck and progressively down to the ground as seen in FIGS. 9A-E. The pillar members rotate relative to the extension members as the platform member is lowered to the ground. This is a particular advantage of the present invention, as it allows a vehicle 12 to be placed and/or driven on the platform when the platform is on ground level, so there is no need for a ramp.

In one embodiment, sprocket adjustment members 29 are provided, wherein the sprocket adjustment member adjusts the distance between the first and second sprockets to regulate the tension of the chain loop, thus the energy transfer from the energy required to lower and raise the platform can be adjusted and controlled if needed.

Figure 7:
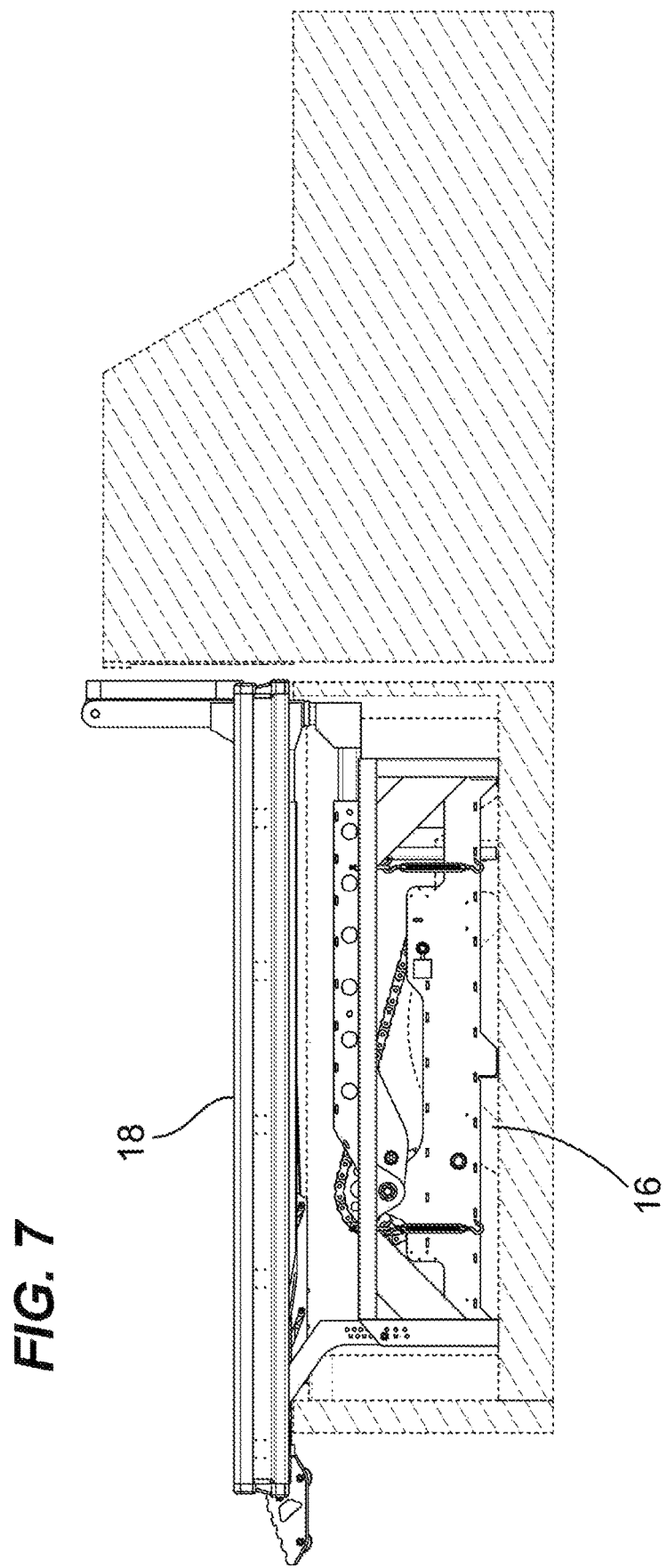
FIG. 7 is a section view of the hydraulic deck mounted on the pickup truck according to an embodiment of the present invention.
Figure 8:
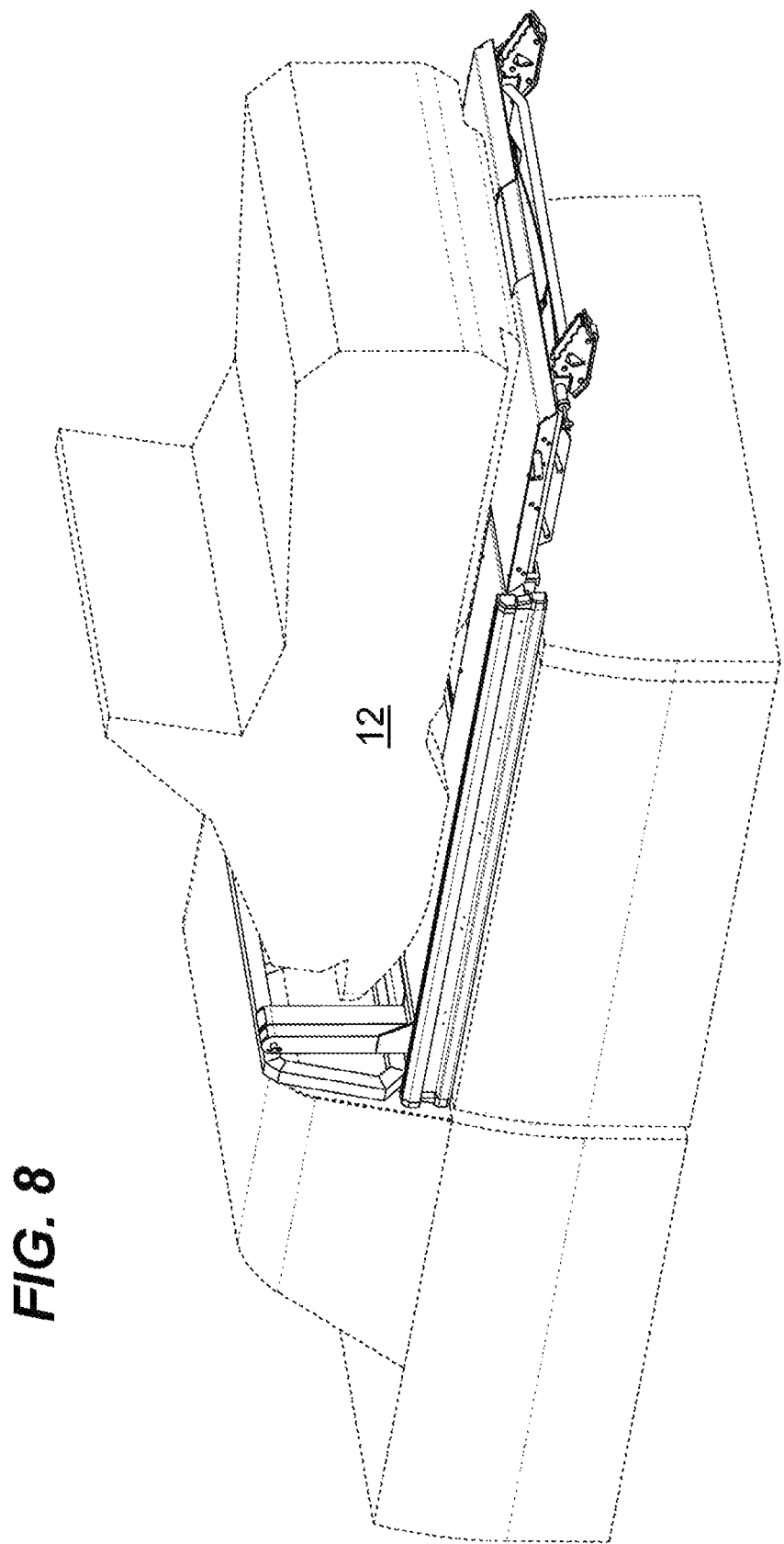
FIG. 8 is a perspective view of a vehicle installed on the platform of the hydraulic deck mounted on the pickup truck according to an embodiment of the present invention.

In one embodiment, the mechanically operated lifting system is located in the bed of the pickup truck under the platform member, best seen in FIG. 7. In one embodiment, the lifting system further comprises a structural body 47 configured and sized to fit inside the bed of the pickup truck. In one embodiment, a plurality of turnbuckles 45 are used to attach the structural body to the bed, such as via hook receiving members (not illustrated) found in bed of the pickup truck as well known in the art. The components of the lifting system, including but not limited to the pair of chain loops, the first and second sprocket, the pair of piston members, and connection brackets are all designed to fit inside a pair of weldments 44 forming part of the structural body, best seen in FIG. 1. In one embodiment, the structural body comprises has a pair of extension elements 53, each having a caster wheel 54 at each respective distal end of the pair of extension elements. In one embodiment, the pair of extension elements is constructed with a hockey stick shape. The extension elements help support and guide the platform member during operation.

Best seen in FIGS. 3A-B, 4B, and 10A-B, in one embodiment, a sub platform 46 is provided underneath the platform member. The sub platform includes a pair of support ledges 48 configured to provide support when the vehicle is of the sled variety, such as the skis of a snowmobile. Referring now to FIGS. 3A and 3B, at least one diagonal channel 50 is configured to accept at least one roller element 52 to facilitate the sub platform being extended and retracted from underneath the platform member. It is a particular advantage of the present invention that the at least one diagonal channel allows the sub platform to be positioned underneath the platform member when recessed (FIG. 3B/4A).

Figure 9A:
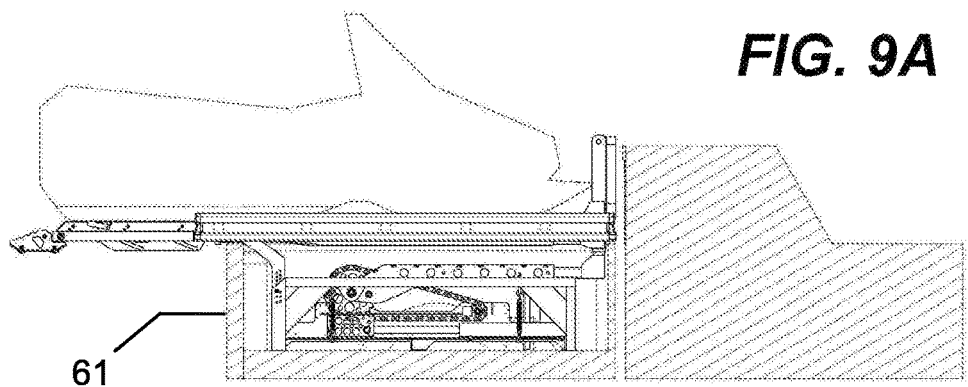
FIGS. 9A-E are section views of the operation of the hydraulic deck according to an embodiment of the present invention.
Figure 9B:
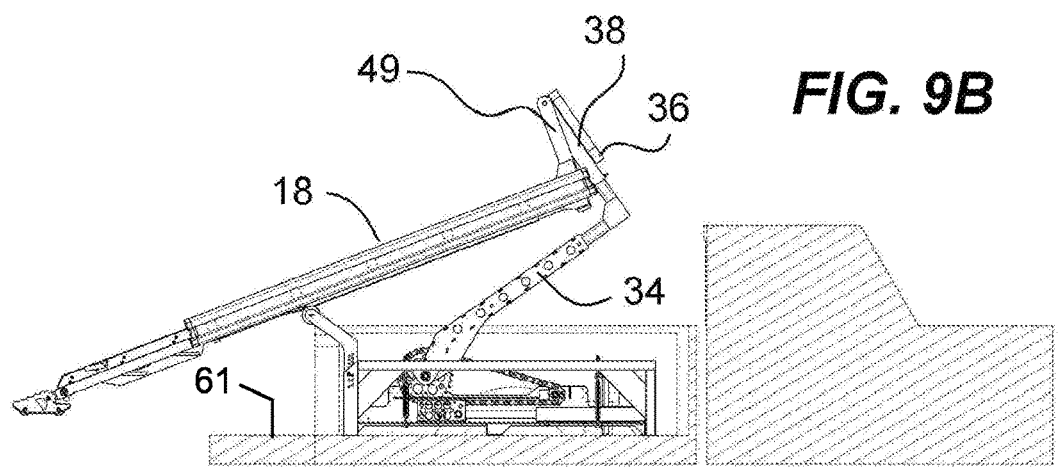
Figure 9C:
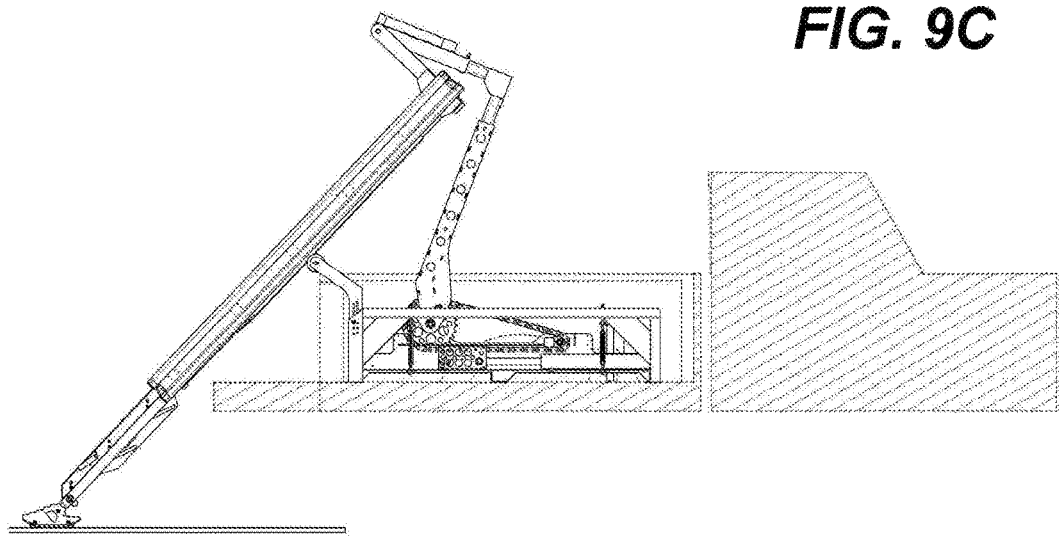
Figure 9D:
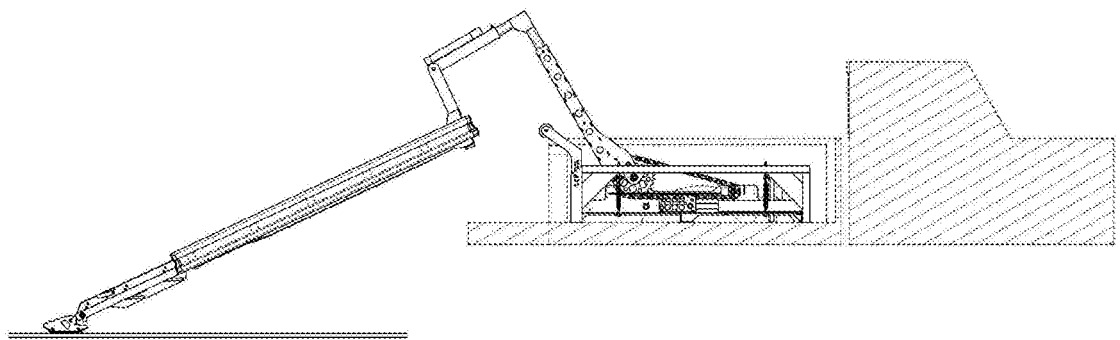
Figure 9E:
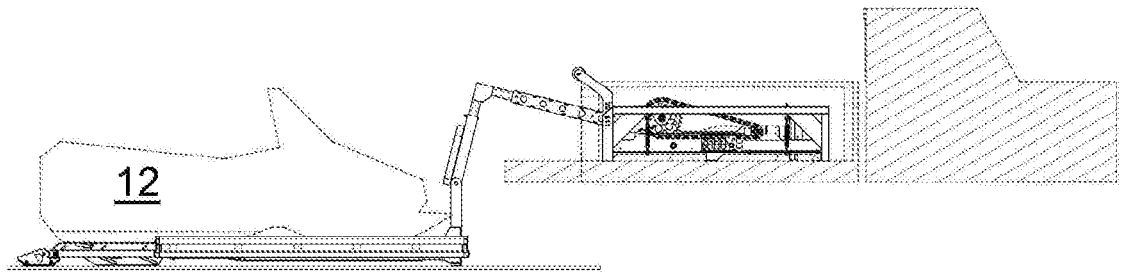
Figure 10A:
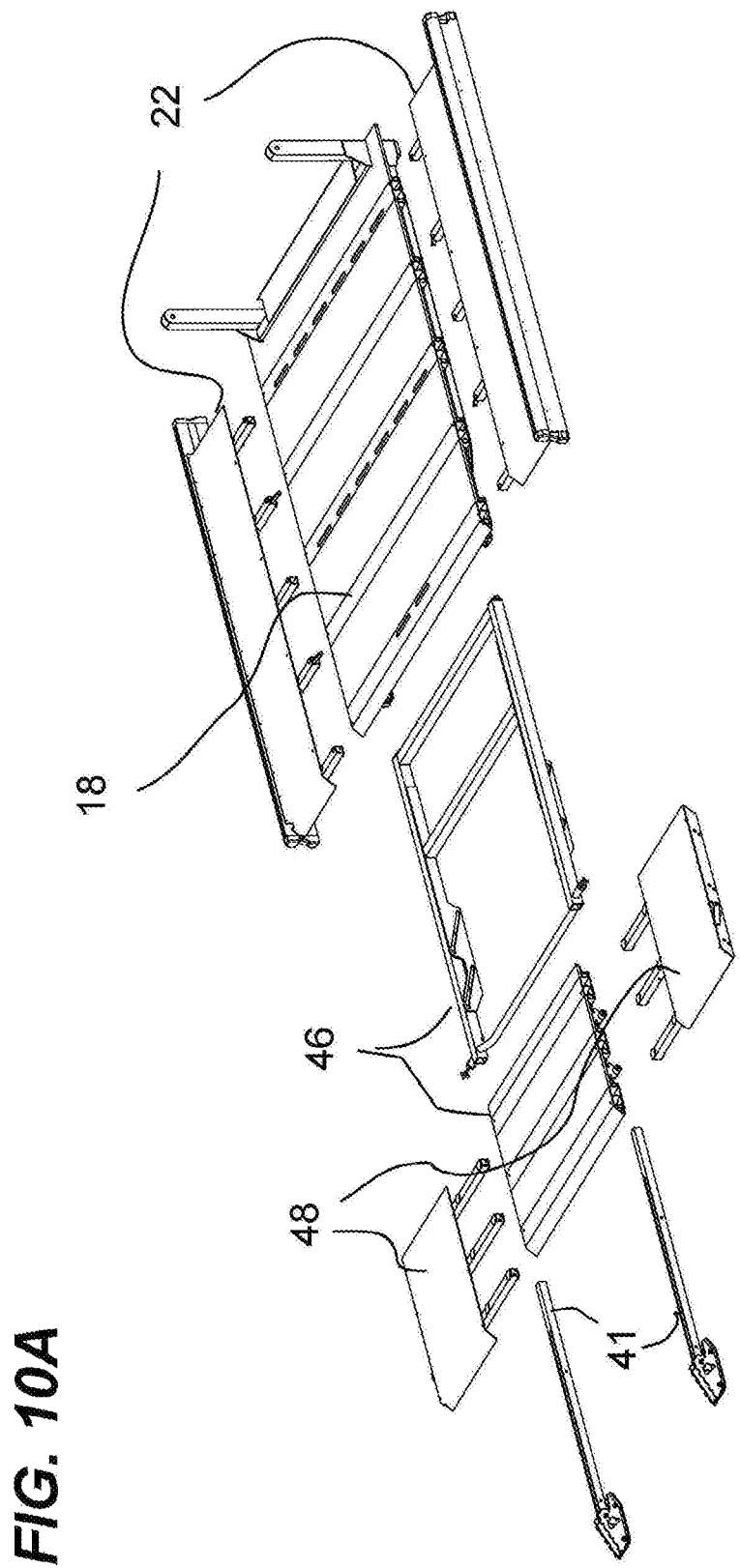
FIGS. 10A-B are exploded views of the top side and the bottom side of the platform and the sub platform with extensions according to an embodiment of the present invention.
Figure 10B:
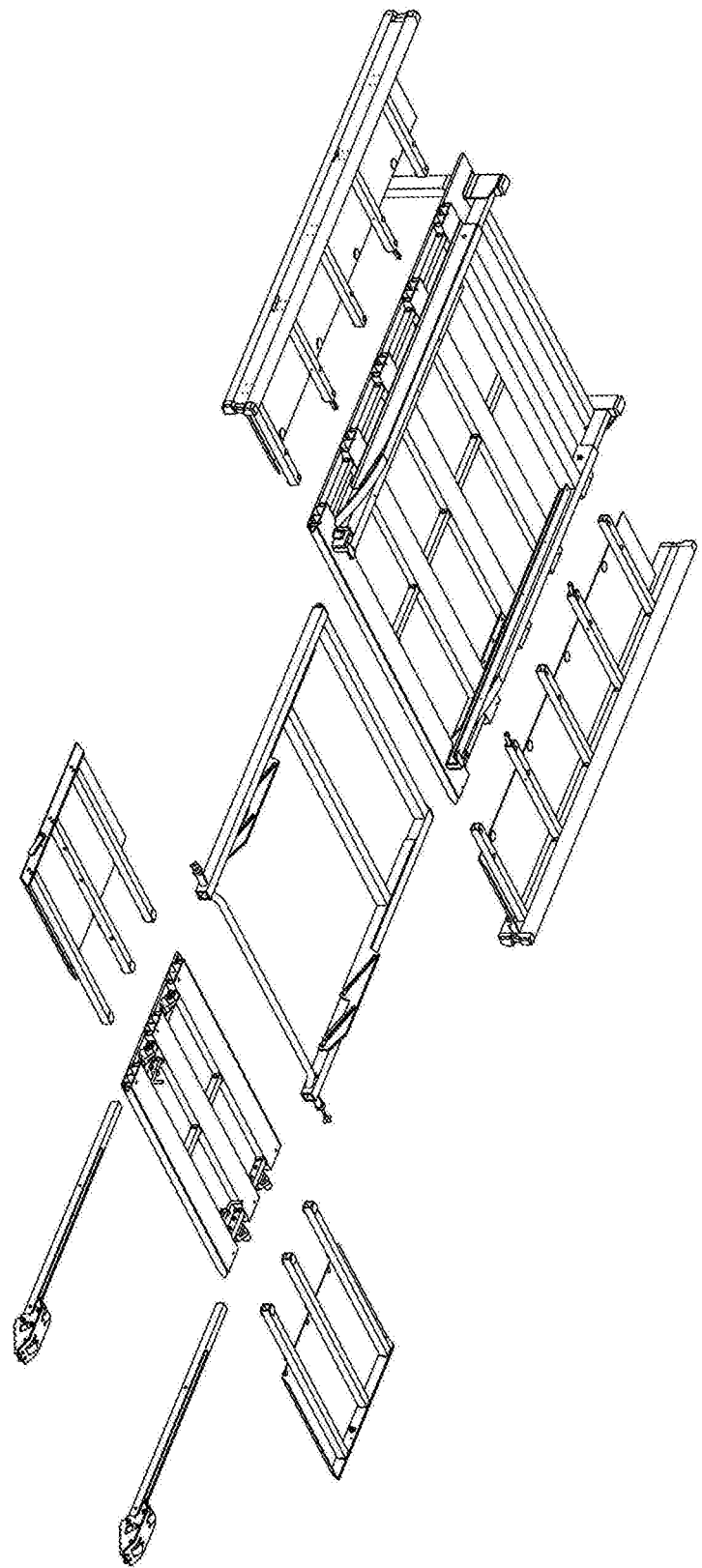

In one embodiment, a pair of skates 40 extends from protracting members 41, wherein the skates make first contact with the ground when the platform member is lowered. Best seen in FIG. 5, each of the pair of skates include a wheel 42 facilitating the operation of the platform member after contact and guiding the platform member on the ground as seen in FIGS. 9C-E. FIGS. 9A-B, show the first steps of operations of the unloading of the loading vehicle platform, which includes the lowering of the rear gate 61 of the pickup truck bed and the start of the rotation of the pivot arm members 34 causing the platform member 18 to be displaced from its resting position on top of the pickup truck bed. As illustrated in FIG. 9B-C, during the rotation of the pivot arm members 34, the platform member 18 may rest upon the caster wheels 54 of each extension elements 53, such that the weight of the platform member 18 and any vehicle that may be carried on top may be distributed through the structure of the vehicle loading platform and the frame of the pickup truck on which it is mounted. FIG. 9C illustrates the position of the system once the skates 40 contact the ground. FIGS. 9D-E illustrates the operation of the mechanism between the ground contact of the skates 40 and the fully grounded position of the platform member 18. As shown in FIG. 9E, when transitioned to the complete grounding position of the platform member 18, the pivot arm members 34 are in a position lower than the caster wheels 54 of each extension elements 53. In such position, the pivot arm members 34 may have experienced a rotation which would interfere with the pickup truck bed's gate 61 had it not been lowered initially.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. A loading vehicle platform for use in a cargo bed of a pickup truck, the loading platform comprising:
   a platform member having a rear end near a tailgate of said cargo bed and for supporting at least one vehicle, and
   a subplatform extensibly mounted near one of:
      a rear end of said platform member for extending a rear length of said platform for supporting a vehicle thereon; and
      a lateral side of said platform member for extending a width of said platform for supporting a vehicle thereon,
   wherein the subplatform has an adjustable height at least between a deployed height providing a top surface of the subplatform to be coplanar with a top surface of the platform member and a lower retracted height,
   wherein the subplatform is slidable under the platform member when at said retracted height, thereby said subplatform being storable under said platform member.

2. The loading vehicle platform of claim 1, wherein the subplatform comprises a subplatform member comprising said top surface of the subplatform, and a subplatform frame slidable under the platform member and coupled to the subplatform member, wherein the adjustable height is provided by adjusting a height of the sub platform member relative to the subplatform frame.

3. The loading vehicle platform of claim 2, wherein the subplatform frame comprises at least one pair of channels coupled to at least one pair of engaging members of the subplatform member, wherein the adjustable height is provided by changing a position of the at least one pair of engaging members in the at least one pair of channels.

4. A ground-loading vehicle platform comprising:
   a platform support frame consisting of at least one horizontal member and at least one vertical member;
   at least one pivot in engagement with the at least one horizontal member;
   a platform member configured to support at least one vehicle, the platform member comprising a subplatform extensibly mounted to the platform member for extending a length of a rear end of the platform for supporting a vehicle thereon, wherein the subplatform has an adjustable height at least between a deployed height providing a top surface of the subplatform to be coplanar with a top surface of the platform member and a lower retracted height, and wherein the subplatform is retractable under the platform member when at said retracted height;
   at least one pillar rotationally connected to a pin member positioned on the at least one vertical member, wherein the at least one pillar extends perpendicularly from a front end of the platform member; and
   a structural body supporting a mechanically operating lifting system configured to be mounted to a pickup truck, wherein the mechanically operating lifting system is configured to slide and lower the platform member from a stored position over a bed of the pickup truck to a loading position on a ground surface by a rotation of the at least one pivot arm member.

5. The ground-loading vehicle platform of claim 4, wherein said structural body is configured and sized to fit inside the bed of the pickup truck.

6. The ground-loading vehicle platform of claim 4, wherein the mechanically operating lifting system comprises at least one chain loop and at least one piston member, wherein said chain loop is configured to engage at least a first and second sprockets, and the at least one piston member having a piston rod connected to the at least one chain loop via connection brackets.

7. The ground-loading vehicle platform of claim 6, wherein the at least one chain loop, the at least one piston member, the at least first and second sprockets, and connection brackets are designed to fit inside the structural body.

8. The hydraulic deck of claim 6, wherein said at least one chain loop comprises a pair of chain loops, the first and second sprockets being located at opposite ends of the pair of chain loops.

9. The ground-loading vehicle platform of claim 4, further comprising a plurality of turnbuckles configured to attach the structural body to the bed of the pickup truck.

10. The ground-loading vehicle platform of claim 4, wherein the sub platform includes a pair of support ledges configured to provide support to the at least one vehicle.

11. The ground-loading vehicle platform of claim 4, wherein the at least one vehicle is selected from the list of an all-terrain vehicle, an off-highway vehicle, a utility vehicle, a motorcycle, or a sled vehicle.

12. The ground-loading vehicle platform of claim 4, further comprising extension support members configured to laterally extend said platform member to accept two vehicles side by side.

13. The ground-loading vehicle platform of claim 4, wherein the subplatform comprises a subplatform frame extensibly coupled to the platform member and a subplatform member, wherein movement of the subplatform member relative to the subplatform frame provides the adjustable height.

14. The ground-loading vehicle platform of claim 13, wherein the subplatform frame comprises at least one pair of channels coupled to at least one pair of rollers connected to the subplatform member, wherein movement of the pair of rollers in the at least one pair of channels provides the adjustable height.

15. The ground-loading vehicle platform of claim 4, further comprising a pair of support ledges couplable to sides of the subplatform to extend a width of the subplatform.

16. The ground-loading vehicle platform of claim 4, further comprising a pair of protracting members connected at a front end to a rear end of the subplatform and further comprising a pair of skates connected to a rear end of the protracting member.

17. The ground-loading vehicle platform of claim 16, wherein the pair of skates is configured to make first contact with the ground surface when the platform is lowered.

18. The ground-loading vehicle platform of claim 17, wherein each of the pair of skates includes a wheel facilitating the operation of the platform member after first contact with the ground surface.

19. The ground-loading vehicle platform of claim 4, wherein the structural body includes at least one platform supporting an extension element configured to support and guide the platform member during operation, wherein the at least one platform supporting the extension element includes a caster wheel at a distal end of the at least one platform supporting extension elements.

20. A ground-loading vehicle platform comprising:
a platform support frame consisting of at least one horizontal member and at least one vertical member;
at least one pivot in engagement with the at least one horizontal member;
a platform member configured to support at least one vehicle, said platform member comprising a subplatform extensibly mounted to a rear end of said platform member for extending a length of said platform for supporting a vehicle thereon;
at least one pillar rotationally connected to a pin member positioned on the at least one vertical member, wherein the at least one pillar extends perpendicularly from the platform member; and
a structural body supporting a mechanically operating lifting system configured to be mounted to a pickup truck, wherein said mechanically operating lifting system is configured to slide and lower the platform member from a stored position over a bed of the pickup truck to a loading position on a ground surface by a rotation of said at least one pivot arm member;
wherein the mechanically operating lifting system comprises at least one chain loop and at least one piston member, wherein said chain loop is configured to engage at least a first and second sprockets, and the at least one piston member having a piston rod connected to the at least one chain loop via connection brackets;
wherein said at least one chain loop comprises a pair of chain loops, the first and second sprockets being located at opposite ends of the pair of chain loops; and
a pair of sprocket adjustment members configured to adjust the distance between the each of the first and second pairs of sprockets to regulate the tension of each of the pair of chain loops.

* * * * *